March 30, 1954 P. GARIEL 2,673,451
APPARATUS FOR SEPARATING SUSPENDED
MATERIAL FROM A FLUID STREAM
Filed Nov. 7, 1951 7 Sheets-Sheet 1
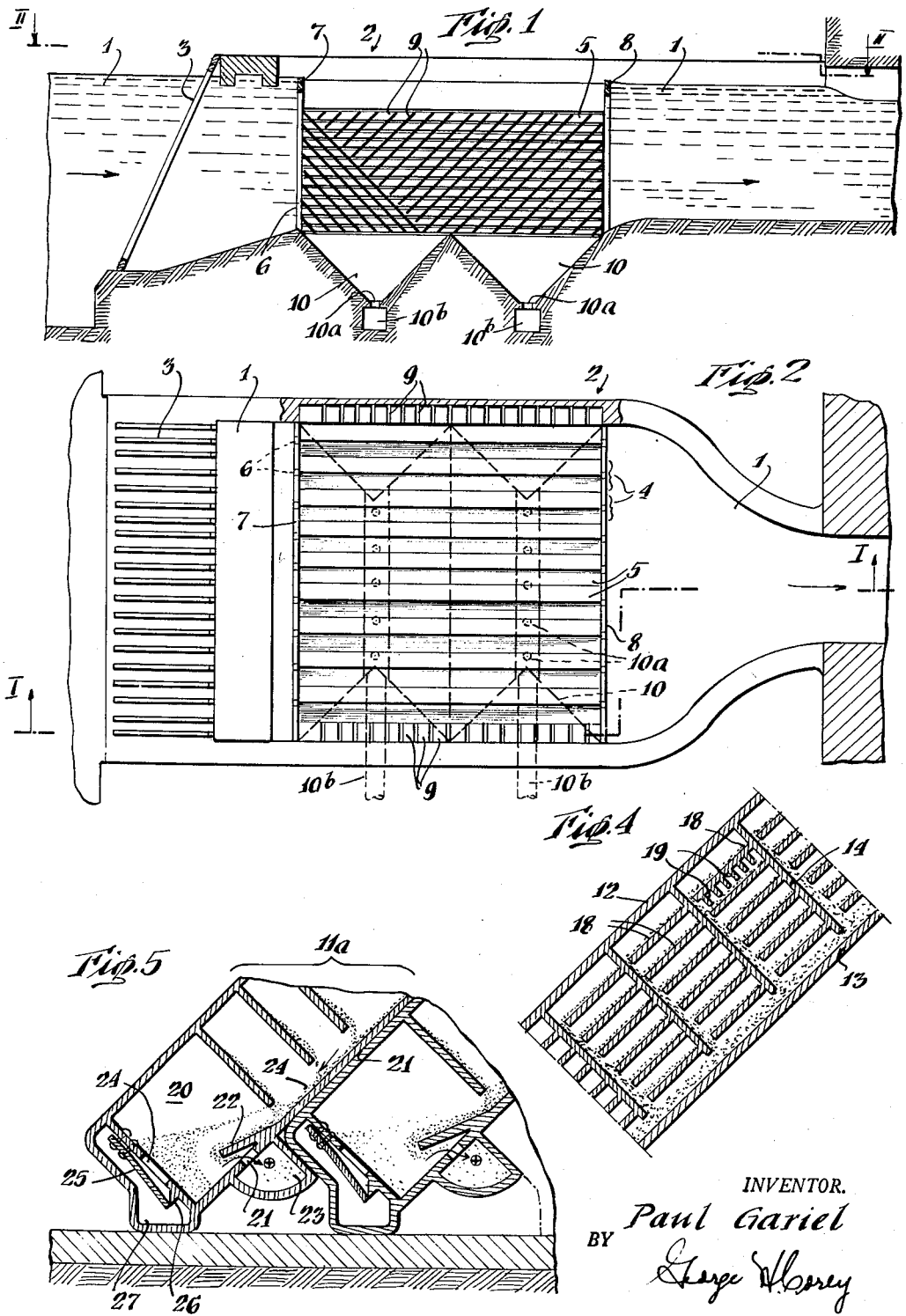
INVENTOR.
Paul Gariel
BY
George W. Corey
ATTORNEY

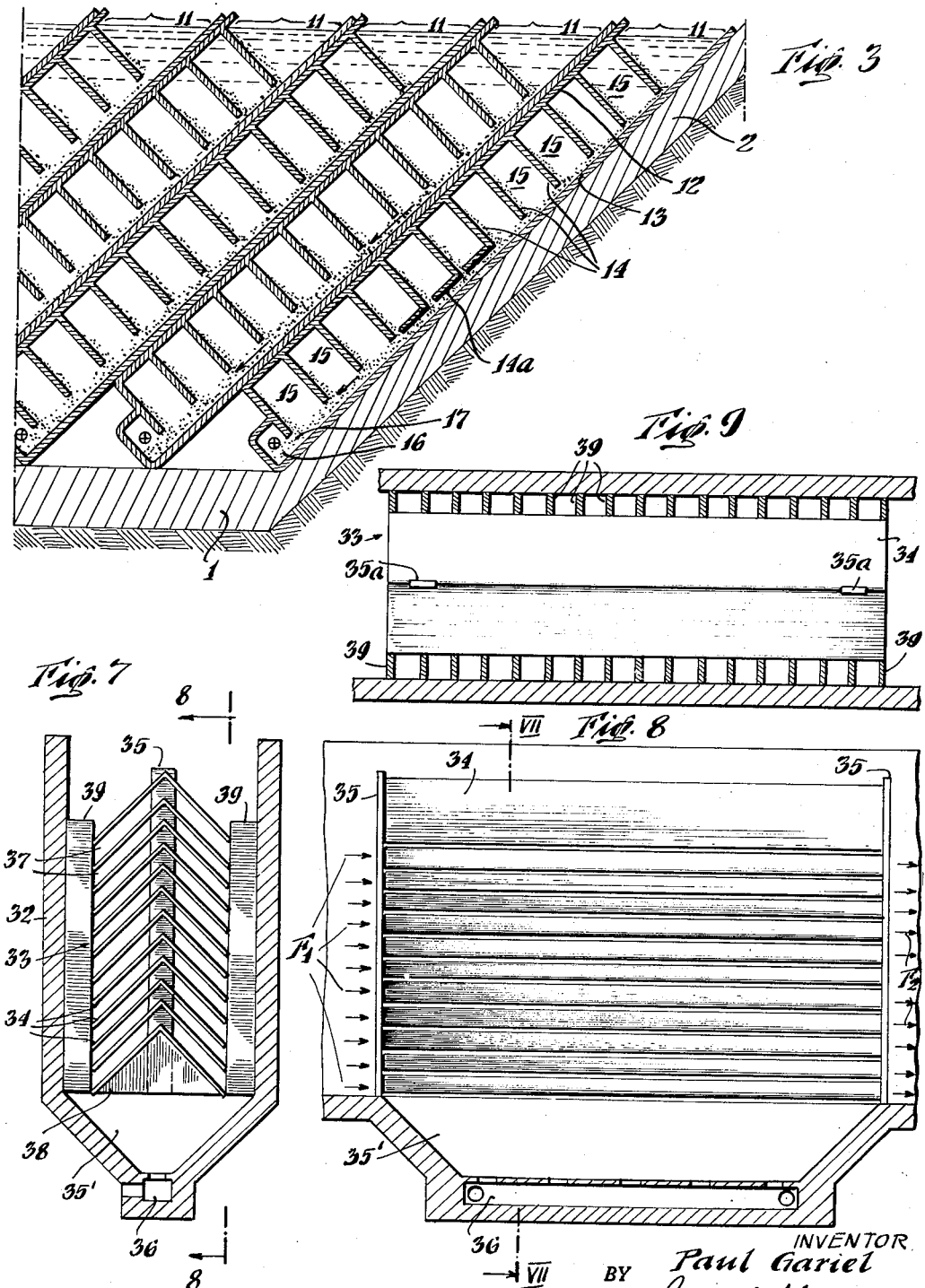

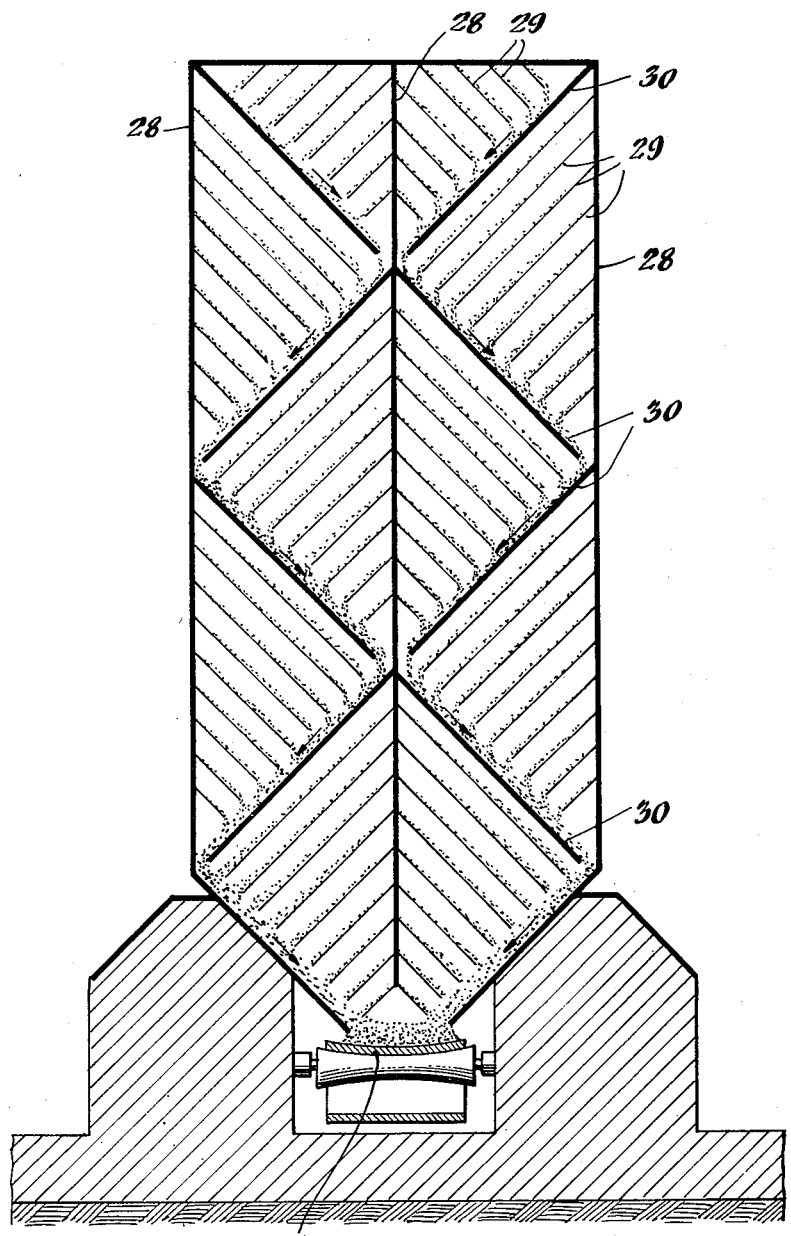

March 30, 1954
P. GARIEL
2,673,451
APPARATUS FOR SEPARATING SUSPENDED
MATERIAL FROM A FLUID STREAM
Filed Nov. 7, 1951
7 Sheets-Sheet 4
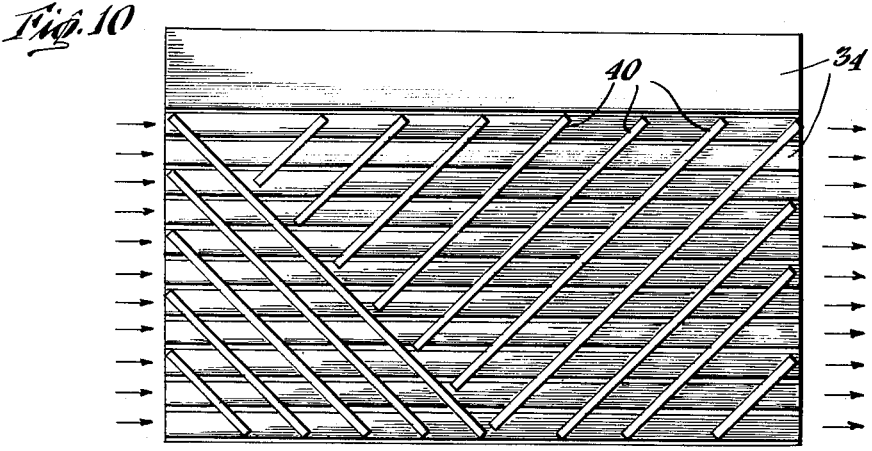
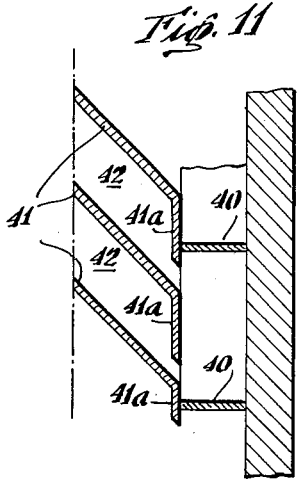
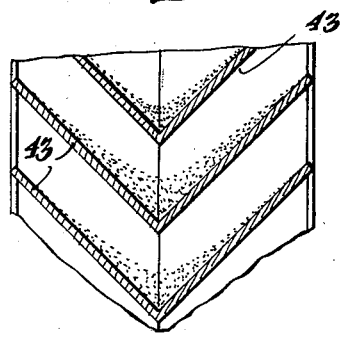
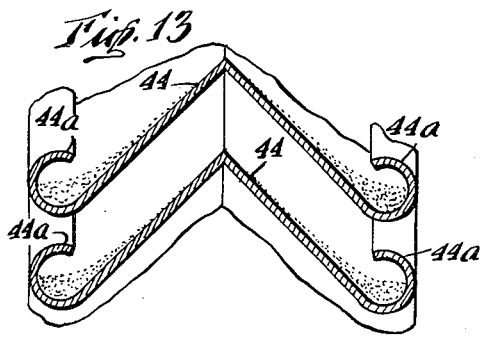
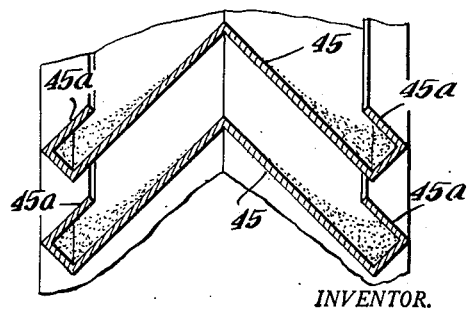
INVENTOR.
Paul Gariel
BY
George W. Cooley
ATTORNEY

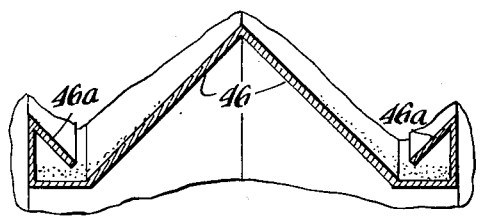
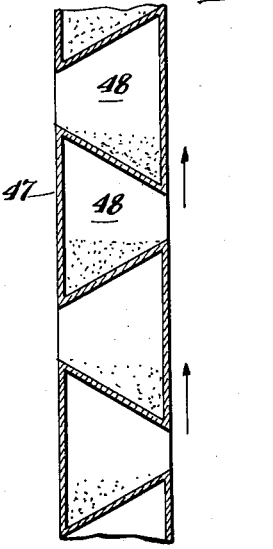
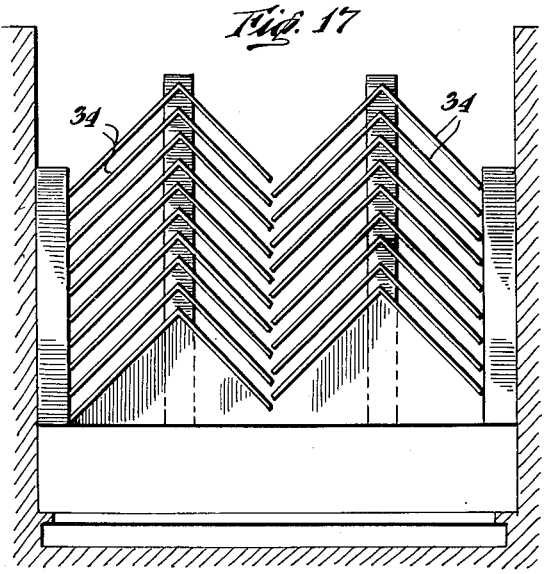
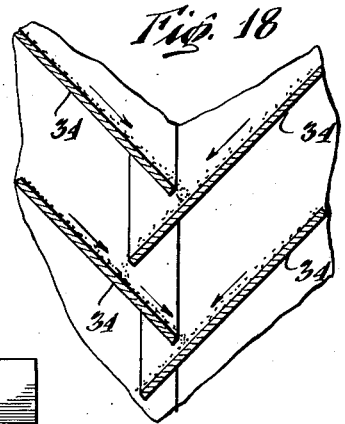
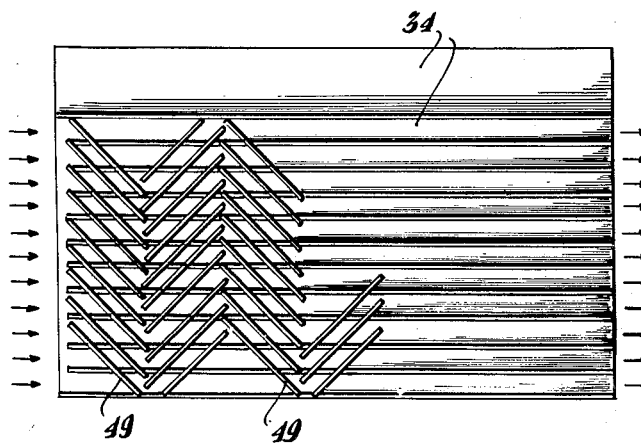

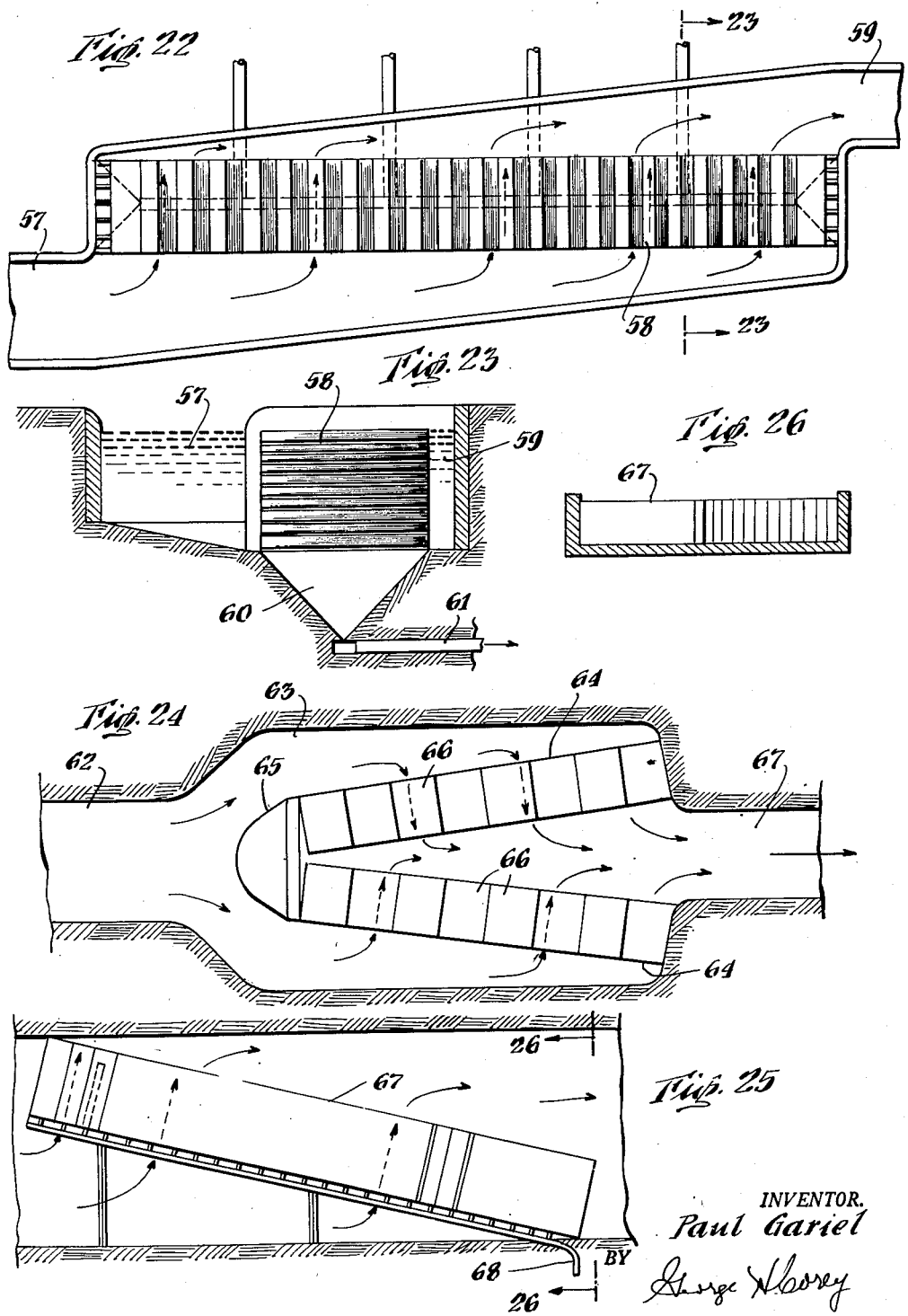

Patented Mar. 30, 1954

2,673,451

UNITED STATES PATENT OFFICE 2,673,451

APPARATUS FOR SEPARATING SUSPENDED MATERIAL FROM A FLUID STREAM

Paul Gariel, Grenoble, France, assignor to Etablissements Neyrpic, Grenoble, France, a corporation of France Application November 7, 1951, Serial No. 255,290

Claims priority, application France November 10, 1950

18 Claims. (Cl. 61—2)

1

The present invention relates to apparatus for separating from a fluid stream suspended particles of material having densities different from that of the fluid in the stream. The invention is disclosed herein as applied to apparatus for removing silt from a stream of water of relatively large volume, such as the water in the intake conduit of a hydroelectric plant. Some of the features of the invention are of particular utility in separating apparatus of this specific type, while other features are usable in separating apparatus generally.

In water supply conduits for hydroelectric plants, it is important that any separating or desilting apparatus have a very small loss of head, since any loss of head represents a loss of power available to the plant. The use of desilting apparatus is therefore not justified unless its loss of head is low. This situation in the past has led to the use of types of desilting apparatus which met the low head requirement, but which did not remove the silt completely. The silt residue which was left in the water produced undesirable erosion of the conduits and of the rotating parts of the turbines.

Separating or desilting apparatus intended for use with a flowing stream must not only cause separation from the stream of particles of material which are carried in suspension, but must also remove those particles from the path of the stream so that the apparatus will not become clogged. This removal must be accomplished, if possible, without allowing the separated particles to be picked up again by the stream.

It is an object of the present invention to provide a separating apparatus which will remove particles of suspended material from a fluid substantially completely, but which produces only a small loss of head.

A further object is to provide an apparatus of the type described which is constructed so as to minimize the possibility of any separated material being picked up again by the fluid.

Another object of the invention is to provide separating apparatus of the type described in which the structural elements may be conveniently and economically constructed.

A further object is to provide an apparatus of the type described in which the separated particles of material are substantially continuously guided along stationary surfaces in their movement from the points where they are first separated from the liquid to a receiver for collecting such material.

The foregoing and other objects of my invention are accomplished by providing a separator unit which may be inserted into a horizontally flowing stream and which includes a plurality of plate members which separate the stream into shallow elongated conduit elements. These plate members are elongated lengthwise of the stream flow and are inclined to the horizontal crosswise of the stream flow at a sufficient angle so that the separated material particles will move laterally down them. The conduit elements therefore have a cross-section in the general shape of a parallelogram. In an apparatus for separating suspended material heavier than the fluid, the elements must be open along their lower vertices to permit the separated material to move downward out of the conduit elements.

It is well known that the velocity of a flowing stream is a minimum at its point of contact with a stationary surface parallel to its direction of flow, being almost zero along such a surface. The structure described, including the parallel plate members, provides a substantial area of such surfaces, and the elongation of the conduit elements allows the silt or other particles to come into contact with such a surface during their passage through the separator. When a particle of suspended material encounters one of these surfaces, it thereafter has one component of motion parallel to the stream flow and another component downwardly along the inclined surface, laterally with respect to the direction of the stream.

A series of guiding surfaces are provided to receive the separated particles leaving the open vertices of the conduit elements. These guiding surfaces are effective to prevent the particles from being picked up again by the stream. These guiding surfaces extend substantially all the way down to a receiver for the separated material, usually located at the bottom of the conduit through which the stream is flowing.

Other objects and advantages of my invention will become apparent from a consideration of the following specification, with reference to the accompanying drawings, in which:

Fig. 1 is a cross-sectional, elevational view, taken on the line I—I of Fig. 2, of a portion of a water supply conduit for a hydroelectric plant, provided with a separator unit constructed in accordance with the invention.

Fig. 2 is a plan view of the conduit and separator of Fig. 1, taken partly in section on the line II—II of Fig. 1.

Fig. 3 is a fragmentary vertical section of a modified form of separator, taken at right angles to the direction of flow.

Fig. 4 is a fragmentary cross-sectional view of a modified form of the separator unit of Fig. 3.

Fig. 5 is a fragmentary cross-sectional view of still another modified form of separator unit, illustrating improved means for removing the accumulated silt from the bottom of the separator.

Fig. 6 is a vertical cross-sectional view of another modified form of separator and silt removing means.

Fig. 7 is a vertical cross-sectional view of still another modified form of separator unit and silt receiver, taken along the line VII—VII of Fig. 8.

Fig. 8 is a vertical sectional view of the separator of Fig. 7, taken along the line VIII—VIII.

Fig. 9 is a plan view partly in section of the separator of Fig. 7.

Fig. 10 is an elevational view similar to Fig. 8, illustrating a modified form of lateral guiding structures.

Fig. 11 is a fragmentary cross-sectional view of a modified form of separator similar to that of Fig. 7, but having an improved separator plate form.

Figs. 12 through 16 are cross-sectional views of modified forms of lateral guiding structures.

Fig. 17 is a cross-sectional view similar to Fig. 7, illustrating a modified form of separator unit.

Fig. 18 is a fragmentary view of a portion of the separator of Fig. 17, on an enlarged scale.

Fig. 19 is an elevational view similar to Fig. 10, showing a modified form of lateral guiding structure.

Fig. 22 is a plan view of a modified form of installation of the separator unit in a canal.

Fig. 23 is a sectional view taken on the line 23—23 of Fig. 22.

Fig. 24 is a plan view of another modified form of installation.

Fig. 25 is a plan view of still another modified installation.

Fig. 26 is a sectional view taken on the line 26—26 of Fig. 25.

*Figs. 1 and 2*

Figure 20:
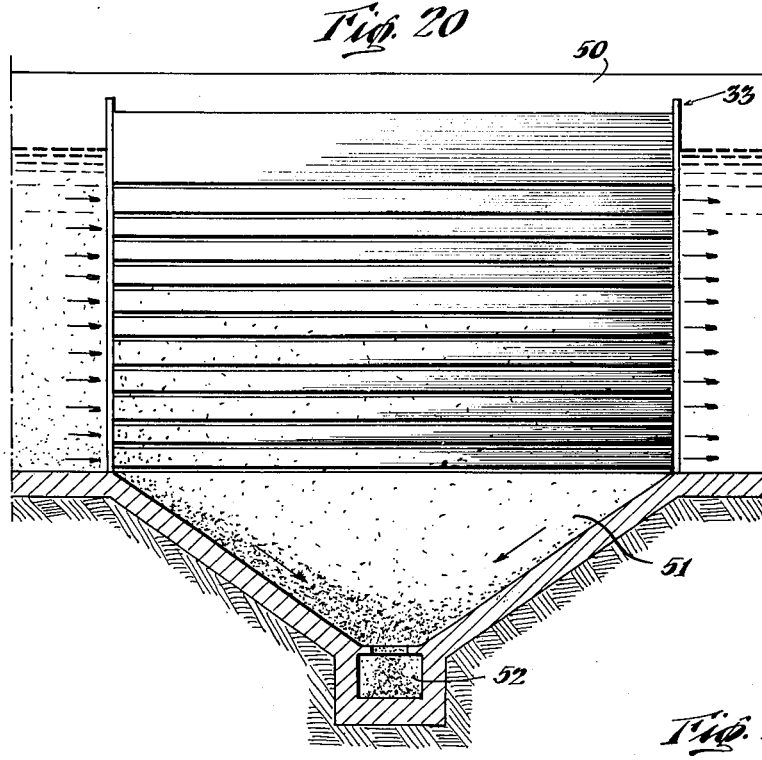
Fig. 20 is a longitudinal cross-sectional view of a separator unit installed in a conduit, with a silt receiver below the separator.

There is shown in these figures a conduit 1 through which water is flowing in the direction indicated by the arrows. There is inserted in this conduit a separator unit 2 which may be of any of the types whose constructional details are set forth below, although it is illustrated as being of the type shown in Fig. 10. It should be noted that the separator unit 2 is aligned with the upstream and downstream sections of the conduit so that the direction of flow through the separator unit is substantially the same as the direction of flow through the conduit.

Upstream from the separator 2 is a grill or grating 3, for screening the larger floating objects from the water. The separator 2 consists of a number of parallel cells or stacks 4, each cell including a number of inverted V-shaped plates 5 mounted at their upstream ends on a supporting framework including an upright 6 for each stack and at least one cross-bar 7 holding the stacks parallel. The downstream ends of the plates 5 are supported on another framework 8, to which may be attached a plate or plates having differently sized apertures aligned with the different cells, so as to produce an equal distribution of the flow among the cells.

The cells 4 which adjoin each other in the middle of the conduit 1 may have their plates staggered and overlapped, as shown and described in detail below in connection with Figs. 17 and 18, so that particles of material falling downward along the plates will be guided to the bottom of the cell or stack. Between the sides of the conduit 1 and the nearest cells are provided downwardly inclined lateral guide plates 9, which serve the same general purpose of guiding the separated particles downwardly. In the upper part of Fig. 2, the plates 9 are shown recessed in the side wall of the conduit, while in the lower part, they are shown projecting into the stream from the side wall. Either type of construction may be used.

Two hoppers 10 extend transversely across the bottom of conduit 1 for receiving the collected silt particles. The bottoms of these hoppers communicate through suitable apertures 10a with silt discharge conduits 10b. The silt may be removed through these conduits by means of a stream of running water.

*Fig. 3*

The separator unit illustrated in Fig. 3 includes a number of similar cells or sections, each of which is generally indicated by the numeral 11. These sections are elongated in the direction of flow through the conduit and each comprises two main parallel plates 12 and 13, which are inclined crosswise of the conduit. The plate 12 is the uppermost of the two. Depending from the plate 12 at substantially right angles thereto are a number of smaller plates 14 which are inclined downwardly so that their lower ends are slightly spaced from the bottom plate 13 of the section. Each of the plates 14 may be provided along its lower side with a flange 14a, extending parallel to the main lower plate 13. The plates 12, 13 and 14 divide the section into a plurality of horizontal conduit elements 15.

Below the lowermost conduit element 15 is provided a silt removing conduit 16 connected to the lowermost conduit element through a slot 17. The conduit 16 is maintained at a pressure lower than that in the lowermost conduit element 15, so that any silt accumulating there is drawn through the slot 17 and discharged through the conduit 16 to any suitable receiver.

As the water flows through the separator unit, it is divided among the several conduit elements, and the water velocity along the lateral surfaces of these elements is reduced substantially to zero. The turbulence in these elements is also substantially eliminated, so that the entrained silt falls gradually to the bottom of the conduit elements due to the fact that its density is greater than that of the water. Each conduit element is of a quadrilateral cross-section, and its bottom surfaces are inclined. When the silt particle reaches an inclined surface at the bottom of a conduit element, it moves along that surface with one component of motion parallel to the water flow and another component directed downwardly and laterally with respect to the direction of water flow. Since the water velocity along those surfaces is very small, the possibility of the silt being again entrained thereby the water is reduced. Each conduit element is open along its lower apex, so that the deposited materials may pass out through that open apex.

If the silt particle is moving down one of the smaller plates 14, then at the lower end of that plate it must pass across a space which is unrestricted in the direction of the fluid flow and through which the stream may be flowing. By making this space as small as possible, the possibility of the silt particles being again entrained at that point is reduced. This possibility may be still further reduced by the use of the flanges 14a, which confine the portions of the flowing stream through which the separated silt particies must fall. The vertical dimensions of this part of the stream are thereby reduced so much that if any particle is entrained as it falls from the lower edge of one of the plates 14, it is probable that it will be again deposited as it moves along between the plate 13 and the flanges 14a. These flanges also prevent any turbulent mixing of the particles moving down plate 13 with the water moving through the conduit elements.

After a silt particle is once deposited on one of the plates 14 or on the plate 13, its path downward to the silt removing conduit 16 is substantially completely guided by inclined surfaces. The number of points at which it must fall freely across a moving stream of water is reduced to a minimum, and the length of each of those free falls is minimized as far as possible.

*Fig. 4*

Fig. 4 illustrates a modification of the structure of one of the sections 11 of Fig. 3. In this modification, each of the plates 14 is provided with a number of downwardly depending plates 18, which further subdivide the conduit elements into still smaller elements. The conduit elements may be even further subdivided by means of plates 19. The dimensions and angle of inclination of the plates and other variable factors in any given installation will be determined in accordance with the nature of the flowing fluid and the nature of the particles to be separated therefrom. Generally speaking, finer particles will require more subdivision of the conduit into smaller elements. The ratio of the length of the conduit elements in the direction of flow to their depth should be substantially greater than the ratio of the average fluid velocity through the separator unit to the velocity of fall of the suspended particles in the fluid. If this condition is met, then all the suspended particles should engage one of the inclined plates before they are carried through the unit.

*Fig. 5*

Fig. 5 illustrates a modified form of silt receiver structure for the lower ends of the sections 11 of the separator unit. This apparatus is suitable for use in installations where there is a wide variation in the proportion of silt carried by the water, and it is desirable to minimize the loss of liquid during periods when the proportion of silt carried is small. At the bottom of each of the sections, identified as 11a in Fig. 5 and corresponding generally to the sections 11 of Fig. 3, there is provided a large chamber 20 in which the silt moving down through the unit may collect. On the right hand bottom wall of the chamber 20 there is provided a slot 21 protected by an overhanging deflector 22. The slot 21 communicates with a silt removing conduit 23, through which a current of water is maintained. If the concentration of silt is relatively small, then the flow through each slot 21 will be sufficient to carry away all the silt coming down through the section 11a. The opposite bottom wall of the chamber 20 is provided with another opening 24 closed by a valve plate 25, which may be resiliently self-biased or biased by a spring (not shown) into engagement with a knife edge seat 26. The valve plate 25 opens into a conduit 27, in which the pressure may be controlled, being reduced at times of heavy silt concentration, so that it is then below the pressure in the chamber 20. Any silt accumulating in chamber 20 at such times passes out through the opening 24, thereby providing a less tortuous path for the discharged silt. The flow of silt through that path is also aided by the difference in pressure between the chamber 20 and the conduit 27. The pressure in conduit 27 may be controlled either manually or automatically.

*Fig. 6*

Fig. 6 illustrates, somewhat diagrammatically, another modified form of the invention, in which each section of a separator unit consists of vertical uprights 28 to which are attached diagonally depending plates 29. The spaces between the uprights 28 are divided into segments of generally triangular cross-section by means of main plates 30, which serve to collect the silt from the plates 29 in the next segment above.

It will be seen that all the silt accumulating on each of the plates 29 is delivered to the next lower main plate 30, passing through a small free fall to reach that main plate. After once reaching a main plate the stream of silt continues downwardly over a succession of main plates, being finally conducted to a belt conveyor 31 which runs longitudinally of the separator unit. The belt conveyor may carry the silt to any convenient point of disposal.

*Figs. 7 and 8*

Figs. 7 and 8 illustrate a modified form of separator unit in which the plate members are so designed that the unit may be constructed very easily and economically. Fig. 7 shows a cross-section of a conduit 32 in which there is placed a separator unit 33 consisting of a stack of vertically spaced plate members 34, of inverted V-shaped cross-section, extending lengthwise of the conduit and supported at their ends by posts 35. The plate members 34 may be attached to the posts 35 by any suitable means, for example, welding. The V-shaped cross-section of the plates gives them high rigidity. The unit 33 rests at its ends on the bottom of the conduit 32. Below the separator 33 is provided a silt collecting hopper 35′ which directs the silt into a conduit 36, from which it may be removed by a stream of running water.

The plate members 34 divide the cross-section of the conduit 32 into a number of elongated conduit elements 37 which are substantially unobstructed throughout their length. The elements 37 have cross-sections which are generally quadrilateral and are open along their lower apices. Any silt falling on the upper surfaces of the plate members 34 moves laterally down those members and out through the open side of the conduit element 37 and then drops to the hopper 35′ in a free fall. The triangular spaces at the ends of the separator unit 33 between the lowermost plate members 34 and the bottom of conduit 32 are blocked by panels 38 to minimize the circulation of water through the hopper 35′ which might cause further entrainment of silt.

*Fig. 9*

Another modification is illustrated in Fig. 9, wherein a number of vertical walls 39 are provided throughout the length of the zone of free fall. These walls 39 serve to reduce the velocity of the stream flowing through that section of the conduit and may even substantially eliminate any flow there, so that the particles falling from the edges of the plate members 37 are protected against being entrained again by the water. The structure shown in Fig. 7, wherein only the ends of the lateral spaces are blocked by the walls 39, does not completely stop the current flow through those spaces. Consequently some of the less dense silt particles will not be able to complete their fall to the hopper 35' before they are carried out of the separator by the current. This structural arrangement is suitable only where such incomplete separation may be tolerated. Otherwise, additional walls 39 must be employed, as shown in Fig. 9.

Fig. 9 also illustrates at 35a a modified supporting post construction. The posts 35a extend through the plates 34, and are of rectangular cross-section with their long dimensions parallel to the direction of flow. In this way, the posts 35a obstruct the longitudinal flow of water as little as possible and also do not obstruct the lateral flow of separated silt.

*Fig. 10*

Fig. 10 illustrates a separator unit including a stack of inverted V-shaped plate members 34 and lateral guide plates 40. These lateral guide plates 40 not only perform the flow-obstructing function of the vertical walls 39 of Fig. 9, but are inclined longitudinally so as to guide the particles of material which fall from the open lower edges of the plate members 34 down to the receiver located at the bottom of the unit. This guiding action further reduces the opportunity for reentrainment of the silt by the water. With such a structure, the maximum free fall distance of any of the silt particles is the vertical distance between the inclined plates. This arrangement also reduces the possibility of silt being entrained by eddies between the plates 40.

*Fig. 11*

Fig. 11 illustrates on an enlarged scale a modified form of construction of the plate members. The plate members 41 in Fig. 11 have downwardly depending flanges 41a formed at their lower ends. These flanges extend vertically. As in the case of other stationary surfaces, the water velocity along these surfaces is at a minimum. Consequently, silt particles falling down the inclined plate members 41 tend to follow the vertical surfaces of the flanges 41a, where the water velocity is substantially zero. These flanges also convey the particles downwardly almost to the next plate member 41 so that the distance through which the particles must fall freely is substantially reduced below the distance required in the previous figures. These flanges 41a still further reduce any eddies which might be set up between the guide plates 40. The silt particles may pass out of the conduit elements 42 through their open lower apices adjacent the edges of the flanges 41a.

The structures shown in Figs. 7 to 11 are typical of arrangements wherein the complete separator unit is constructed from a single stack of plate members. In many installations, it may be desirable to construct a complete separator unit by placing a number of such stacks side by side across the conduit. In some cases, the stacks may be placed end to end, where extreme elongation of the conduit elements is required.

Where the stacks are placed side by side, it is desirable to provide some guiding structure, such as the guide plates 40, between the adjacent stacks, to aid in conveying the deposited particles to the hopper at the bottom of the conduit.

*Figs. 12 to 15*

Figs. 12 to 15 illustrate modified forms of lateral guide plates which may be used in place of the flat guide plates 40 of Figs. 10 and 11. Since these plates are symmetrical, they may be used between adjacent stacks in a multiple parallel stack separator unit. In Fig. 12, the guide plates 43 have a V-shaped cross-section, so that the silt particles falling along one of them tend to gather at the bottom of the V. This portion of the guide plate is protected to some extent from eddies and other currents by the sides of the V. The possibility of the deposited silt particles being again picked up by the water is thereby further reduced.

In Fig. 13, the lateral guide plates 44 have a cross-section generally in the shape of an inverted V with their lateral edges rolled over as shown at 44a to form partially enclosed conduits through which the silt may move downward. The rolled over edges 44a protect the silt moving therein from being picked up by the current.

In Fig. 14 the guide plates 45 are similar to the guide plates 44 of Fig. 13, but their edges 45a are bent over angularly rather than being rolled in a smooth curve.

Fig. 15 shows still another type of guide plate 46 of the same general contour as the guide plates 44 and 45, but with its edges 46a bent over angularly to form a partly enclosed conduit of substantially triangular cross-section.

*Fig. 16*

Fig. 16 shows quite a different type of lateral guide plate at 47. This guide plate 47 is folded in a zigzag fashion to form recesses 48 which open on alternate sides of the guide plate 47. These recesses 48 are almost completely shielded from any water current flowing through the separator unit. The guide plate 47 is particularly intended for use between stacks of a parallel stack separator, but it may be used at the sides of a single stack separator, in which case no silt would collect in the folds opening against the side wall. Each guide plate 47 is self-supporting, and needs only to be slid in between two parallel stacks of inverted V-shaped plates, or between one stack and a side wall. It rests at least at its ends on the bottom of the conduit and is sufficiently rigid to maintain itself in place.

While small deposits of silt may build up at the edges of the V-shaped plates along the closed sides of the recesses 48, these deposits remain small. After a certain amount of silt is deposited, any further accretion is carried along to the next open recess 48.

All the other forms of guide plates shown must be supported by attachment to other parts of the structure, such as the adjacent V-shaped plates, the conduit wall, or a suitable supporting framework (not shown).

*Figs. 17 and 18*

Fig. 17 shows a separator unit including two parallel stacks of inverted V-shaped plate members 34. The two stacks are arranged so that the edges of their plate members overlap slightly and are staggered. This overlapping and staggering of the plate members provides a convenient form of guided path for silt particles moving downwardly toward the receiver between the two stacks. While this path has many gaps where the silt must fall freely, the length of the free fall is very small at each gap. Fig. 18 shows this guided path in greater detail. It may there be seen that silt particles moving down the uppermost plate member 34 have only a short free fall to reach the next plate member 34 and that they move on downwardly from one plate member to another with relatively short free falls between the plate members.

Fig. 19

Fig. 19 shows an adaptation of the principle illustrated in Figs. 17 and 18 to the construction of lateral guide plates 49. These lateral guide plates are arranged in parallel stacks which are alternately inclined in opposite directions, with the plates of each stack staggered with respect to the plates of the adjacent stacks and with the ends of the plate members on adjacent stacks overlapping.

It should be noted that the structure shown in Fig. 19 is effective not only to convey silt particles downwardly, but to convey particles of lighter materials upwardly. The upwardly moving particles would go up through the peaks of the inverted V's, whereas the downwardly moving particles would pass through the peaks of the upright V's. This same type of construction may be used in place of the inverted V plates 34 of Fig. 17, in which case the entire unit is adapted to separate both particles which are more dense than the fluid and particles which are less dense than the fluid.

Fig. 20

Fig. 20 illustrates a separator unit 33 installed in a conduit 50 above a silt receiver 51. The silt receiver 51 is of the simple hopper type, and directs the silt downwardly into a silt removing conduit 52.

Fig. 21

Figure 21:
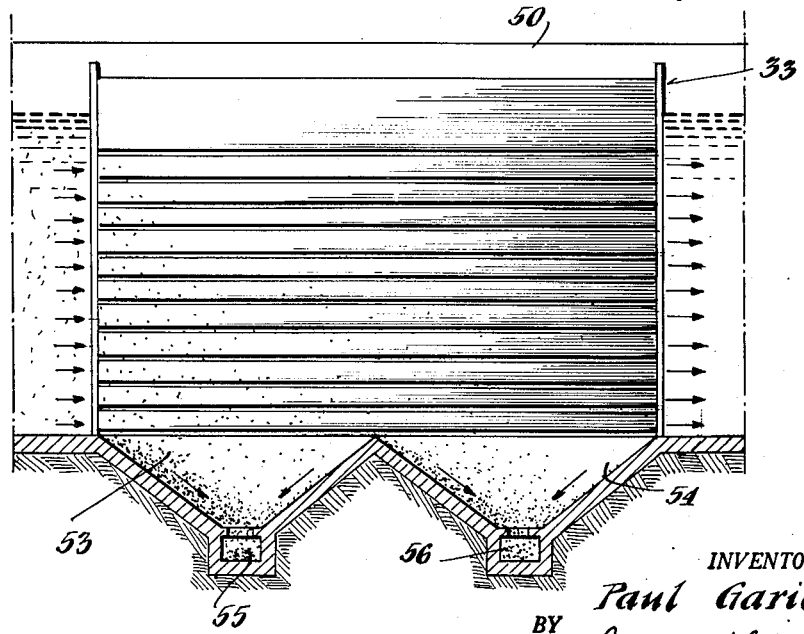
Fig. 21 is a view similar to Fig. 20, illustrating a modified form of silt receiver.

Fig. 21 illustrates an arrangement similar to Fig. 20 which is adapted to separate the silt into two components. This arrangement is provided with two silt receivers 53 and 54. The upstream silt receiver 53 collects the heavier particles of silt and delivers them to a conduit 55. The downstream silt receiver 54 collects the lighter particles and delivers them to a conduit 56. A structure of the type shown in Fig. 21 may be utilized to separate particles having different densities, and is especially useful in the treatment of ores.

It should be noted that the hoppers 51, 53 and 54 have their sloping surfaces extending transverse to the direction of current flow, whereas the hopper 35 of Fig. 7 has its sloping surfaces extending parallel to the direction of current flow. The silt discharge conduits 53, 55 and 56 likewise extend at right angles to the current flow, where the conduit 36 of Fig. 7 is parallel to it. The construction shown in Figs. 20 and 21 is preferred when a plurality of parallel stacks are used.

It may be necessary in some cases to provide means for ensuring a uniform distribution of flow among the conduit elements so that each conduit element will be efficiently utilized. Such a distribution may be obtained by providing a plate across the downstream end of some or all of the conduit elements, with openings in the plate of different sizes as required to produce the uniform distribution.

The structures shown, with certain exceptions mentioned, are arranged to separate from a fluid stream particles of material whose densities are greater than that of the fluid. The same structures could be utilized to separate materials whose densities are less than that of the fluid, by simply inverting the separator units, and placing suitable receivers at the top of the conduit instead of the bottom.

Figs. 22 and 23

These figures illustrate an installation of an separator unit in accordance with the invention in a canal, in which the separator unit is placed in the canal so as to provide a lower velocity of flow through the separator than through the canal sections upstream and downstream from it. The upstream section of the canal is indicated at 57, the separator unit at 58 and the downstream section at 59. The separator unit itself may be similar to any of those previously described, and a detailed description of it is believed to be unnecessary. The flow through the separator is substantially at right angles to the direction of flow through the canal sections 57 and 59. The width of the upstream canal section 57 decreases in the downstream direction along the inlet side of the separator 58, and the width of the downstream section 59 increases in the downstream direction along the outlet side of the separator 58. A hopper 60 and a material discharge conduit 61 are provided corresponding generally to the structures previously disclosed.

Fig. 24

This figure illustrates a plan of another installation of separating apparatus in a canal. Here again, the velocity of flow through the separator is reduced below the velocity elsewhere in the conduit. In this case, the canal 62 is provided with widened portion 63 which receives two separator units 64, arranged in a V formation with the vertex of the V facing upstream and closed by a wall 65. Each unit 64 includes a number of cells 66. The water flows through the cells to the center of the V, which is open at its downstream end to the downstream section 67 of the conduit.

Figs. 25 and 26

These figures illustrate how a separator unit according to the invention may be installed in an existing canal, so as to reduce the velocity of flow through the separator, without widening the canal. The separator unit is placed diagonally of the canal. The flow through the separator plates is generally at an oblique angle to the direction of flow through the canal.

The separator unit is shown at 67, and includes a number of parallel cells. Each cell is provided with a receiver as described above, the silt deposited in the several receivers being collected in a conduit 68. The separator 67 is divided into cells or stacks, as in the previous modifications, these stacks being shown diagrammatically to simplify the drawing.

In all the installations of Figs. 22 to 26, the cross-sectional area perpendicular to the direction of flow through the separator is much greater than the cross-sectional area perpendicular to the direction of flow in the canal upstream and downstream from the installation. The velocity of flow is consequently reduced in the separator, with a consequent improvement in the proportion of solids deposited for a given separator length.

I claim:

1. Apparatus for separating from a fluid stream particles of material having densities different from that of the fluid in the stream, comprising a horizontally extending conduit through which said stream flows, a separator in said conduit comprising a plurality of spaced parallel plate members extending lengthwise of the direction of flow through said separator and inclined to the horizontal crosswise of said direction of flow, said plate members being elongated in said direction of flow and defining therebetween substantially unobstructed elongated conduit elements, each having a generally quadrilateral cross-section with at least one vertically directed apex formed of two adjacent inclined surfaces, said material tending to move vertically in said fluid by virtue of its different density, said elements being elongated sufficiently as compared to their vertical depth and the rate of vertical movement of the material so that the particles of material engage the plates before passing completely through said conduit elements, said plate members being thereafter effective to guide said particles laterally and vertically toward said apices, said elements being open along the apices so that the particles may move vertically through said open apices, a receiver for said particles at the vertical extremity of the separator toward which the particles move, and means defining paths to said receiver for particles moving vertically through said open apices.

2. Apparatus for separating from a liquid stream particles of material having a greater density than the liquid, comprising a horizontally extending conduit through which said stream flows, a separator in said conduit comprising a plurality of spaced parallel plate members extending lengthwise of the direction of flow through said separator and inclined to the horizontal crosswise of said direction of flow, said plate members being elongated in said direction of flow and defining therebetween substantially unobstructed elongated conduit elements, each having a generally quadrilateral cross-section with a downwardly directed apex formed of two adjacent inclined surfaces, each said element being partially enclosed by said plates and open along said apex, said plate members being effective to guide downwardly and laterally toward said open apices particles of said material falling thereon, a receiver for said particles at the bottom of said separator, and means defining paths to said receiver for particles falling through said open apices.

3. Apparatus for separating from a liquid stream particles of material having a greater density than the liquid, comprising a horizontally extending conduit through which said stream flows, a separator in said conduit comprising a plurality of spaced parallel plate members extending lengthwise of said conduit and inclined to the horizontal crosswise of said conduit, said plate members being elongated in the direction of flow of said stream through said conduit and defining therebetween substantially unobstructed elongated conduit elements, said elements being aligned with the conduit sections upstream and downstream therefrom so that the liquid flows through said elements substantially without change of direction, each element having a generally quadrilateral cross-section with a downwardly directed apex formed of two adjacent inclined surfaces, each said element being partially enclosed by said plates and open along said apex, said plate members being effective to guide downwardly toward said open apices any particles of said material falling thereon, a receiver for said particles at the bottom of said separator, and means defining paths to said receiver for particles falling through said open apices.

4. Apparatus for separating from a liquid stream particles of material having a greater density than the liquid, comprising a horizontally extending conduit through which said stream flows, a separator in said conduit comprising a plurality of spaced parallel plate members extending in the direction of flow through the separator and inclined to the horizontal crosswise of said direction of flow, said plate members being elongated in said direction of flow and defining therebetween substantially unobstructed elongated conduit elements, said elements extending at an angle to the direction of flow through the conduit sections upstream and downstream therefrom so that the liquid changes direction when entering the conduit elements and again on leaving them, each element having a generally quadrilateral cross-section with a downwardly directed apex formed of two adjacent inclined surfaces, each said element being partially enclosed by said plates and open along said apex, said plate members being effective to guide downwardly toward said open apices any particles of said material falling thereon, a receiver for said particles at the bottom of said separator, and means defining paths to said receiver for particles falling through said open apices.

5. Apparatus for separating from a liquid stream particles of material having a greater density than the liquid, comprising a horizontally extending conduit through which said stream flows, a separator having open upstream and downstream faces and closed sides, said separator extending diagonally across said conduit with the upstream end of one side engaging one lateral wall of the conduit and the downstream end of the other side engaging the opposite lateral wall, so that all the flow through the conduit must pass through the separator, said separator comprising a plurality of spaced parallel plate members extending in the direction of flow and inclined to the horizontal crosswise of said direction of flow, said plate members being elongated in said direction of flow and defining therebetween substantially unobstructed elongated conduit elements, said elements extending at an angle to the direction of flow through the conduit sections upstream and downstream therefrom so that the liquid changes direction when entering the conduit elements and again on leaving them, each element having a generally quadrilateral cross-section with a downwardly directed apex formed of two adjacent inclined surfaces, each said element being partially enclosed by said plates and open along said apex, said plate members being effective to guide downwardly toward said open apices any particles of said material falling thereon, a receiver for said particles at the bottom of said separator, and means defining paths to said receiver for particles falling through said open apices.

6. Apparatus as defined in claim 1, in which said path defining means comprises a plurality of guides each having at least one surface extending at an angle to the horizontal with the edges of each such surface nearest said receiver closely adjacent another such surface, said guides cooperating to form guided paths for vertically moving particles, said paths extending substantially continuously along such surfaces between said open apices and said receiver.

7. A separator for removing from a substantially horizontally flowing fluid stream particles of material having densities different from that of the fluid in the stream, comprising a plurality of plate members, means supporting said plate members in parallel spaced relationship with said members extending lengthwise of the direction of flow through the separator and inclined to the horizontal crosswise of said direction of flow, said plate members being elongated in the direction of flow of said stream through said conduit and defining therebetween substantially unobstructed elongated conduit elements, each said conduit element having a generally quadrilateral cross-section with at least one vertically directed apex formed of two adjacent inclined surfaces, said particles tending to move vertically in said fluid by virtue of their different densities, said elements being elongated sufficiently as compared to their vertical depth and the rate of vertical movement of the material so that the particles of material engage the plates before passing completely through said conduit elements, said plate members being thereafter effective to guide said particles laterally and vertically toward said apices, said elements being open along the apices so that the particles may move vertically through said open apices, a receiver for said particles at the vertical extremity of the separator toward which the particles move, and means for guiding particles from said open apices to said receiver comprising a plurality of guides each having at least one surface extending at an angle to the horizontal with the edge of each such surface nearest said receiver closely adjacent another such surface, certain of said guides having such surfaces closely adjacent said open apices, said guides cooperating to form guided paths for vertically moving particles, said paths extending substantially continuously along such surfaces between said open apices and said receiver.

8. A separator for removing from a substantially horizontally flowing fluid stream particles of material having densities greater than that of the fluid in the stream, comprising a plurality of plate members, means supporting said plate members in parallel spaced relationship with said members extending lengthwise of the direction of flow through the separator and inclined to the horizontal crosswise of said direction of flow, said plate members being elongated in said direction of flow and defining therebetween substantially unobstructed elongated conduit elements, each said conduit element having a generally quadrilateral cross-section with a downwardly directed apex formed of two adjacent inclined surfaces, said plate members being effective to guide downwardly toward said apices any of said particles which fall thereon, said elements being open along said apices so that the particles may move downwardly therethrough, a receiver for such particles at the bottom of the separator, and guide means underlying the open apices and extending substantially continuously to said receiver to engage particles falling through said apices and guide them downwardly substantially all the way from said apices to said receiver.

9. A separator for removing from a substantially horizontally flowing fluid stream particles of material having densities smaller than that of the fluid in the stream, comprising a plurality of plate members, means supporting said plate members in parallel spaced relationship with said members extending lengthwise of the direction of stream flow and inclined to the horizontal crosswise of the direction of stream flow, said plate members being elongated in said direction of flow and defining therebetween substantially unobstructed elongated conduit elements, each said conduit element having a generally quadrilateral cross-section with an upwardly directed apex formed of two adjacent inclined surfaces, said plate members being effective to guide upwardly any of said particles lighter than the fluid which rise into contact therewith, said elements being open along their apices so that the particles may move upwardly therethrough, means at the top of said separator for receiving said lighter particles, and guide means overlying the open apices of said conduit elements and extending substantially continuously to said receiving means to engage particles rising through said apices and guide them upwardly substantially all the way from said apices to said receiver.

10. A separator for removing from a substantially horizontally flowing fluid stream particles of material having densities different from that of the fluid in the stream, comprising a plurality of plate members, means supporting said plate members in parallel spaced relationship with said members extending lengthwise of the direction of stream flow and inclined to the horizontal crosswise of the direction of stream flow, said plate members being elongated in said direction of flow and defining therebetween substantially unobstructed elongated conduit elements, each said conduit element having a generally quadrilateral cross-section with upwardly and downwardly directed apices formed of two adjacent inclined surfaces and being open along said apices, said plate members being effective to guide downwardly toward said downwardly directed apices particles of greater density than the fluid which fall thereon, and to guide upwardly toward said upwardly directed apices particles of smaller density than the fluid which rise into contact therewith, a receiver for said particles of greater density at the bottom of said separator, first guide means underlying the open downwardly directed apices of said conduit elements and extending substantially continuously to said receiver to engage particles falling through said downwardly directed apices and guide them downwardly substantially all the way from said apices to said receiver, means at the top of the separator for receiving said particles of smaller density and second guide means overlying the open upwardly directed apices of said conduit elements and extending substantially continuously to said receiving means to engage particles rising through said upwardly directed apices and guide them upwardly substantially all the way from said apices to said receiving means.

11. A separator for removing from a substantially horizontally flowing fluid stream particles of material having densities greater than that of the fluid in the stream, comprising a plurality of plate members of inverted V-shaped cross-section, means supporting said plate members in parallel spaced relationship with said members extending lengthwise of the direction of fluid flow, said plate members being elongated in said direction of flow and defining therebetween substantially unobstructed elongated conduit elements, said plate members being arranged in a plurality of stacks located side by side with the plate members of each stack staggered and overlapped at their edges with respect to the plate members in the adjoining stacks, said plate members being effective to guide downwardly and laterally toward their edges any of said particles more dense than the fluid which fall thereon, and a receiver for heavy particles at the bottom of the separator, the overlapped lower edges of said plate members being effective to engage particles falling from the lower edge of each plate member and guide them downwardly substantially all the way from said lower edges to said receiver.

12. A separator for removing from a substantially horizontally flowing fluid stream particles of material having densities different than that of the fluid, comprising a plurality of plate members, means supporting said plate members in parallel spaced relationship with said members extending lengthwise of the path of fluid flow and inclined to the horizontal crosswise of said path, said plate members being elongated in said direction of flow and defining therebetween substantially unobstructed elongated conduit elements, each having a generally quadrilateral cross-section with at least one vertically directed apex formed of two adjacent inclined surfaces, said plate members being arranged in a plurality of stacks located side by side with the plate members of each stack inclined in the opposite sense to the plate members in the adjoining stacks and staggered and overlapped at their edges with respect to said plate members in the adjoining stacks, said particles tending to move vertically in said fluid by virtue of their different density, said plate members being effective to guide vertically and laterally toward said apices any of said particles of different density than the fluid which move into contact therewith, said elements being open along said apices so that the particles may move vertically therethrough, and means at the vertical extremity of the separator toward which the particles move for receiving said particles, the overlapped edges of said plate members being effective to engage particles moving through said apices and guide them vertically substantially all the way from said apices to said receiver.

13. A separator for removing from a substantially horizontally flowing fluid stream particles of material having densities greater than that of the fluid in the stream, comprising a plurality of elongated plate members of inverted V-shaped cross-section, means supporting said plate members in at least one stack in parallel spaced relation with said members extending lengthwise of the direction of stream flow, said plate members being elongated in said direction of flow and defining therebetween substantially unobstructed elongated conduit elements, each said conduit element having a generally quadrilateral cross-section with an upwardly directed apex formed of two adjacent inclined surfaces, said plate members being effective to guide downwardly and laterally toward the laterally disposed edges thereof any of said particles more dense than the fluid which fall thereon, said elements being open along said edges so that the particles may move downwardly therethrough, a receiver for said particles at the bottom of the separator, and a plurality of spaced parallel guide plates on at least one side of said stack, said guide plates extending transverse to the direction of stream flow and effective to reduce the stream velocity past the particles falling through said apices on said one side of the stack.

14. A separator as defined in claim 13, in which said guide plates are vertical.

15. A separator for removing from a substantially horizontally flowing fluid stream particles of material having densities greater than that of the fluid in the stream, comprising a plurality of elongated plate members of inverted V-shaped cross-section, means supporting said plate members in at least one stack in parallel spaced relationship with said members extending lengthwise of the direction of stream flow, said plate members being elongated in said direction of flow and defining therebetween substantially unobstructed elongated conduit elements, each said conduit element having a generally quadrilateral cross-section with an upwardly directed apex formed of two adjacent inclined surfaces, said plate members being effective to guide downwardly and laterally toward the laterally disposed edges thereof any of said particles more dense than the fluid which fall thereon, said elements being open along said edges so that the particles may move downwardly therethrough, a receiver for said particles at the bottom of the separator, and a plurality of spaced parallel guide plates on at least one side of said stack, said guide plates being inclined longitudinally of the direction of stream flow and effective to engage particles falling through said apices on said one side of the stack and guide them downwardly substantially all the way from said apices to said receiver.

16. A separator as defined in claim 15, in which said guide plates are of V-shaped cross-section.

17. A separator as defined in claim 15, in which said guide plates are generally of an inverted V-shaped cross-section, and have their edges bent upwardly and over upon themselves to form partially enclosed troughs for guiding said particles downward.

18. A separator for removing from a substantially horizontally flowing fluid stream particles of material having densities greater than that of the fluid in the stream, comprising a plurality of elongated plate members, means supporting said plate members in at least one stack in parallel spaced relationship with said members extending lengthwise of the direction of stream flow and inclined to the horizontal crosswise of the direction of stream flow, said plate members being elongated in said direction of flow and defining therebetween substantially unobstructed elongated conduit elements, each element having a generally quadrilateral cross-section with an upwardly directed apex formed of two adjacent inclined surfaces, said plate members having flanges extending vertically downward at their lower edges, said flanges being narrower than the distance between said plates so that said conduit elements are open along said edges, said plate members being effective to guide downwardly toward said open edges any of said particles more dense than the fluid which fall thereon, said flanges being effective to guide vertically downward particles which fall through the openings at said open edges, a receiver for said particles at the bottom of the separator, and a plurality of spaced parallel guide plates on at least one side of said stack, said guide plates being inclined longitudinally of the direction of stream flow and effective to engage particles falling through said openings and along said flanges and guide them downwardly substantially all the way from said flanges to said receiver.

PAUL GARIEL.

References Cited in the file of this patent

UNITED STATES PATENTS

| Number | Name | Date |
|---|---|---|
| 1,190,863 | Corne et al. | July 11, 1916 |
| 1,458,805 | Christensen | June 12, 1923 |
| 1,946,415 | Schmid | Feb. 6, 1934 |

FOREIGN PATENTS

| Number | Country | Date |
|---|---|---|
| 17,980 | Great Britain | 1896 |